United States Patent [19]

Bando

[11] Patent Number: 4,486,238

[45] Date of Patent: Dec. 4, 1984

[54] METHOD AND APPARATUS OF CLEANING THE FACES OF PLASTIC FORMING METAL MOLDS

[76] Inventor: Kazuo Bando, No. 81-8, Tōyama, Momoyama-chō Fushimi-ku, Kyōto-shi, Japan

[21] Appl. No.: 347,056

[22] Filed: Feb. 8, 1982

[30] Foreign Application Priority Data

Feb. 12, 1981 [JP] Japan .................................. 56-19773

[51] Int. Cl.³ .............................................. B29F 1/03
[52] U.S. Cl. ..................................... 134/6; 15/312 R; 15/345; 15/380; 134/8; 134/21; 134/37
[58] Field of Search ........................... 134/6, 8, 21, 37; 15/380, 381, 312 R, 345

[56] References Cited

U.S. PATENT DOCUMENTS

| 3,442,706 | 5/1969 | Derrick | 134/37 X |
| 4,020,526 | 5/1977 | Johansson | 15/381 X |
| 4,169,299 | 10/1979 | Bandoh | 15/345 X |
| 4,213,794 | 7/1980 | Wooding | 134/6 |
| 4,321,095 | 3/1982 | Argo | 134/6 |
| 4,333,772 | 6/1982 | Mulligan | 134/21 X |

*Primary Examiner*—Sidney Marantz
*Attorney, Agent, or Firm*—Larson and Taylor

[57] ABSTRACT

A method and apparatus for cleaning the faces of plastic forming metal molds in which brush members opposite to the mold faces are vibrated by a suitable vibration-applying member. The tips of the brush members beat and break flashes of residual plastic stuck to the metal mold faces, thereby to remove the flashes. The thus removed flashes are sucked and taken out from the metal mold faces by sucking means, thus cleaning the metal mold faces.

9 Claims, 4 Drawing Figures

METHOD AND APPARATUS OF CLEANING THE FACES OF PLASTIC FORMING METAL MOLDS

BACKGROUND OF THE INVENTION

In plastic forming, a resin is flowed and stuck to the abutting faces of the metal molds, thus forming flashes. Most of these flashes are removed together with a formed product when such product is taken out from the molds. However, if there remain any flashes on the mold faces, such residual flashes will provoke the occurrence of further flashes or other troubles. It is therefore necessary to completely remove flashes from the mold faces by cleaning the mold faces upon the completion of each forming process.

In particular, when a thermo-setting resin of the epoxy type is used, its stickiness to the mold faces is strong. It becomes therefore very difficult to manually remove the flashes. Furthermore, if the molds are pressed with any residual flashes stuck thereto, there is produced an extremely great partial pressure which provokes damages to the abutting faces of the molds.

In order to eliminate the dangers associated with a manual flash removal and to improve the flash removing efficiency, there has been developed a cleaning method according to which air is blown to the mold faces. The flashes stuck to the mold faces are then removed by rotary brush means, and the thus removed flashes are sucked away. According to such cleaning method, however, since the rotary brush means are used as flash removing members, the removing action of such brush means is made merely to such extent as to sweep off the flashes by the brush tip portions. Accordingly, effective flash removal cannot be expected even though a cooling action by blowing air is combined with a sweeping action by the rotary brushes. It therefore still takes a relatively long period of time to completely remove the flashes. Thus, such method can hardly contribute to improvements in efficiency of manufacturing plastic forming products.

SUMMARY OF THE INVENTION

The present invention relates to a method and apparatus of cleaning the faces of plastic forming metal molds, and more particularly to a cleaning method and apparatus for removing and taking out residual flashes stuck to the faces of plastic forming metal molds.

It is a main object of the present invention to provide a method and apparatus for cleaning the faces of plastic forming metal molds which are capable of removing residual flashes stuck to the faces of metal molds in an efficient and secure manner and in a short period of time.

It is another object of the present invention to provide a method and apparatus for cleaning the faces of plastic forming metal molds, in which vibrant brush members are used as flash removing means, so that flash removal is achieved in a more efficient and secure manner as compared with a conventional method and apparatus using rotary brushes.

It is a further object of the present invention to provide a method and apparatus for cleaning the faces of plastic forming metal molds in which, while or after residual flashes stuck to the faces of the metal molds are removed, such flashes are sucked and taken out to the outside of a forming machine, so that flash removal is achieved in an efficient and secure manner.

The present invention relates to a method and apparatus for cleaning the faces of plastic forming metal molds, said method comprising the steps of applying vibration to brush members disposed oppositely to the faces of plastic forming metal molds, beating and breaking flashes stuck to the metal molds, by the tips of the brush members, thereby to remove the flashes, and sucking and taking out the thus removed flashes; and said apparatus comprising a cleaning mechanism disposed movably with respect to the faces of plastic forming metal molds, and an operating mechanism for actuating the cleaning mechanism, the cleaning mechanism having brush members for removing flashes stuck to the faces of the metal molds, a vibration-applying member for vibrating the brush members and sucking means for sucking and taking out the thus removed flashes.

According to the method and apparatus for cleaning the faces of plastic forming metal molds of the present invention, the beating and breaking action of the tips of the vibrant brush members is remarkably excellent, as compared with a conventional cleaning method and apparatus in which the tips of the rotary brush means merely sweep off the metal mold faces to remove flashes. Thus, the flash removing efficiency can be greatly improved and cleaning of the metal mold faces can be achieved in an efficient and secure manner in an extremely short period of time, thereby to remarkably improve efficiency of manufacturing plastic forming products by a plastic forming machine which should be efficiently operated in a repeated and continuous manner.

Furthermore, according to the present invention, even though the tips of the brush members are worn out due to frequent use of the brush members, the brush tips undergo substantial no change in shape but are maintained in the original shape. Therefore, the excellent flash removal above-mentioned can be maintained for a long period of time.

BRIEF DESCRIPTION OF THE DRAWINGS

The present invention will be further described, by way of example, with reference to the accompanying drawings, in which.

DETAILED DESCRIPTION OF THE PREFERRED EMBODIMENT

Figure 1:
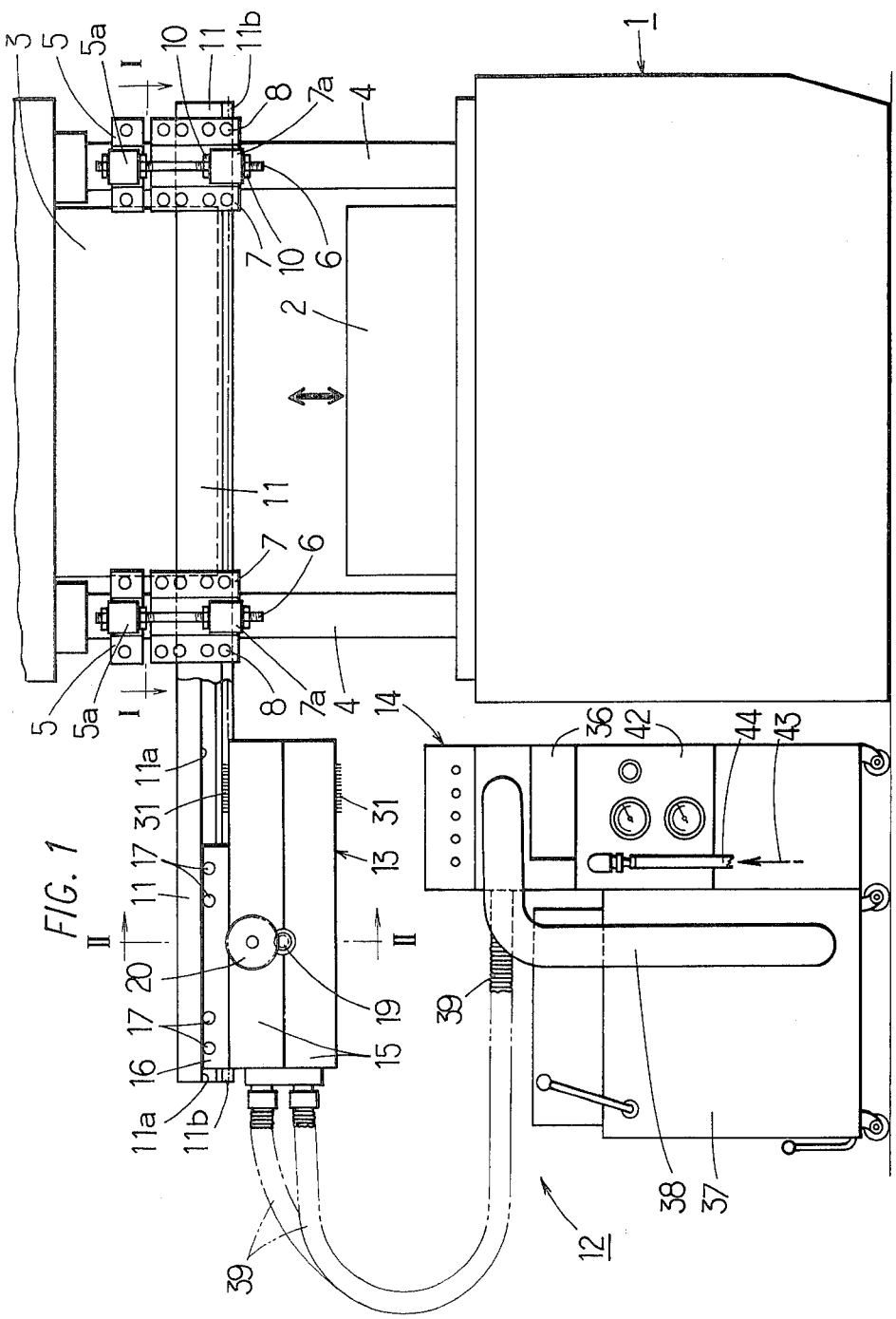
FIG. 1 is a front view, with portions omitted, of a plastic forming machine having a metal mold face cleaning machine in accordance with the present invention.
Figure 2:
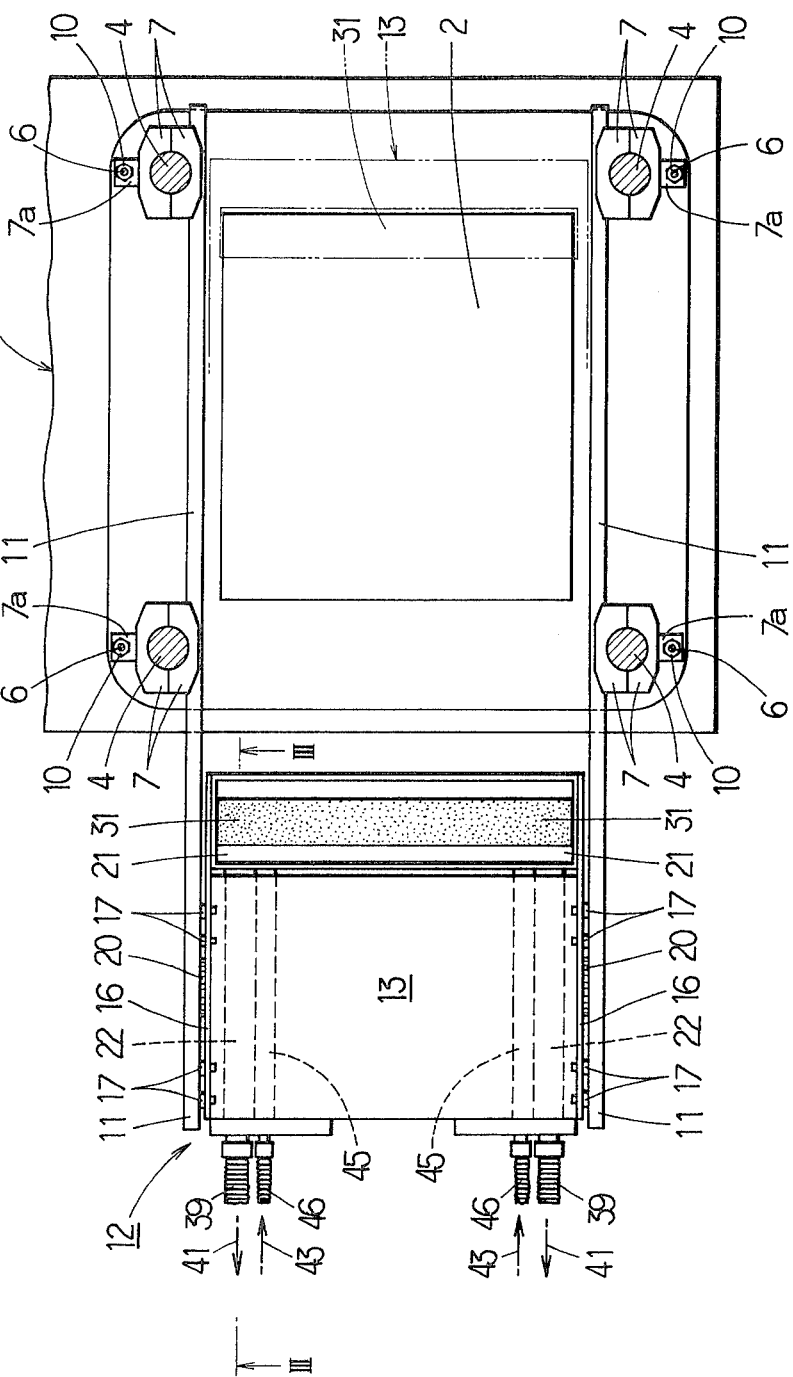
FIG. 2 is a section view, with portions omitted, taken along the line I—I in FIG. 1.

Apparatus for cleaning the faces of plastic forming metal molds in accordance with the present invention comprises a plastic forming machine and a mold cleaning machine.

The plastic forming machine 1 includes a vertically movable metal mold 2 and a fixed metal mold 3 disposed oppositely to and on the mold 2 and supported by four supports 4 vertically disposed outside the four corners of the movable metal mold 2. Securing means 5 are secured to the upper portions of the supports 4, respectively.

Disposed on the outer surface of each securing means 5 is a nut 5a to which a bolt 6 is threadedly secured at the upper end thereof. A fixing means 7 fittingly surrounds each support 4 under each securing means 5. The fixing means 7 are arranged such that their positions on the supports 4 are adjusted by fixing members 8 which can be fastened and loosened.

Disposed on the outer surface of each fixing means 7 is a communicating portion 7a having therein a vertical hole 9, into which the bolt 6 is inserted at the lower end thereof. Each fixing means 7 is adjustably fixed to each support 4 by upper and lower nuts 10 of the communicating portion 7a threadedly connected to the bolt 6.

A pair of parallel guide rails 11 are horizontally attached at one end thereof to the plastic forming machine 1 through the fixing means 7 between the moving metal mold 2 and the fixed metal mold 3. The other ends of these guide rails 11 are extended by a predetermined length from the forming machine 1. Each of the guide rails 11 has a guide groove 11a in the inner surface thereof and a rack 11b at the lower surface thereof.

The cleaning machine 12 has a mold face cleaning mechanism 13 disposed under the guide rails 11 in a horizontally movable manner, and an operating mechanism 14 for actuating the cleaning mechanism 13.

The cleaning mechanism 13 has upper and lower frames 15. Support plates 16 are mounted to the upper edges of the upper frame 15 along the guide rails 11. Each of the support plates 16 has a plurality of rollers 17, which are fittingly engaged with the guide groove 11a in each guide rail 11.

Figure 3:
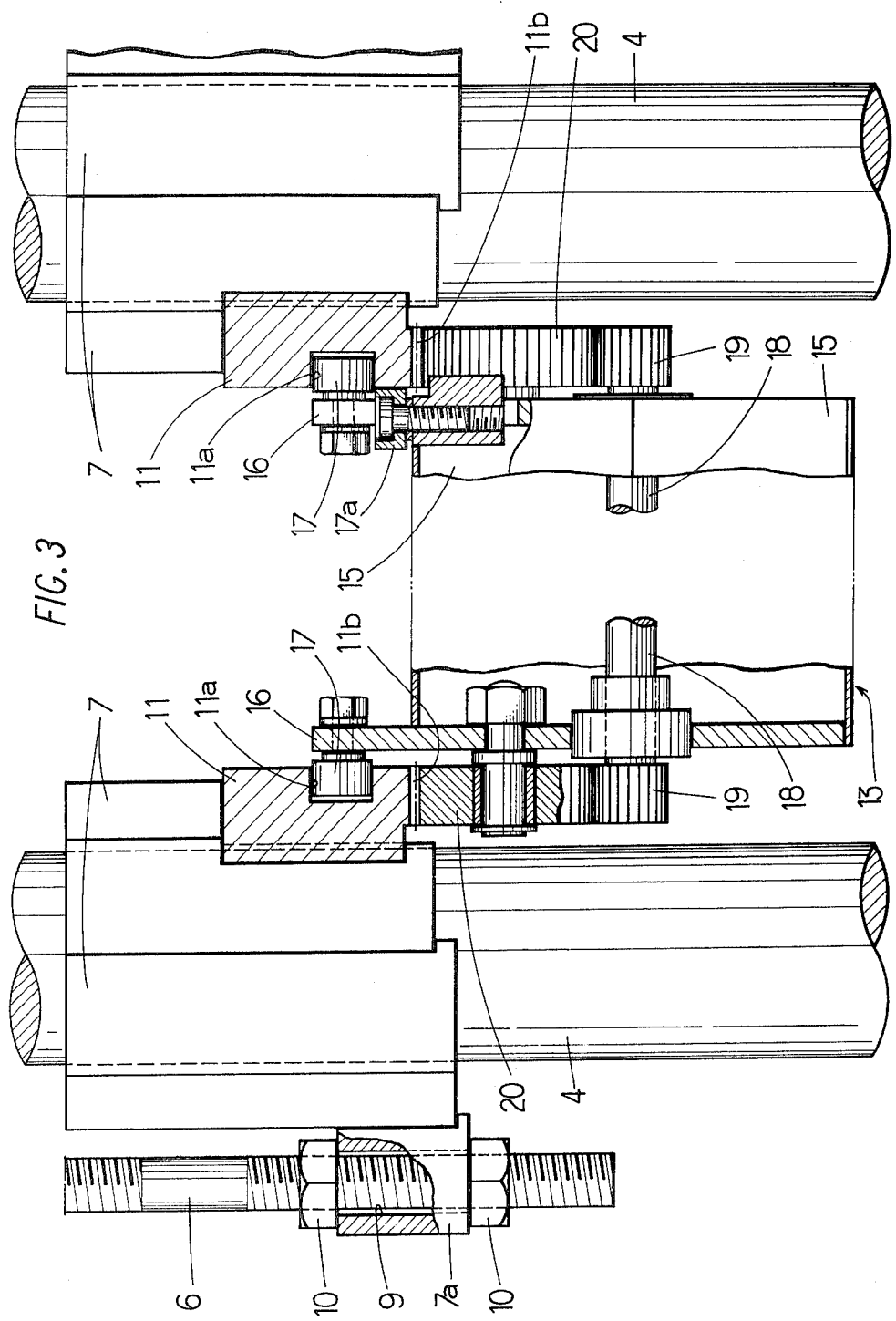
FIG. 3 is an enlarged section view, with portions omitted, taken along the line II—II in FIG. 1.

As shown in FIG. 3, both ends of a drive shaft 18 which are connected to a motor (not shown) and which are capable of forwardly and reversely rotating, project from both sides of the frame 15. Driving gears 19 respectively disposed at the ends of the drive shaft 18 are meshed with the racks 11b of the guide rails 11 through transmission gears 20.

Thus, the cleaning mechanism 13 is suspendingly held by the guide rails 11 in a horizontally movable manner through the rollers 17. Accordingly, when a forward or reverse rotating force of the motor is transmitted to the transmission gears 20 through the drive shaft 18 and the driving gears 19, the cleaning mechanism 13 is moved in the left or right direction. Such movement of the cleaning mechanism 13 can be facilitated by disposing, between the respective rollers 17, a suitable number of guide rollers 17a in contact with the inner surfaces of the guide rails 11.

Hollow brush holders 21 are disposed in the frames 15. A duct 22 simultaneously forming a support arm is communicatingly connected at the tip thereof to each holder 21. The base ends of the ducts 22 are rotatably pivoted to each other through a shaft 23.

Rotating members 24 of the ducts 22 and the brush holders 21 include cylinders 26 pivotally connected to the side walls of the frames 15 through shafts 25, and pistons 27 disposed in the cylinders 26. The projecting ends of the pistons 27 are pivotedly connected to the ducts 22, respectively, through suitable pivoting members 28.

Disposed in the cylinders 26 are springs 29 for pressingly moving the pistons 27 toward the shafts 25. Arrangement is made such that compressed air 30 is introduced into the cylinders 26 for pressing the pistons 27 toward the pivoting members 28 against the springs 29 to rotate the ducts 22 and the brush holders 21.

Metal mold cleaning brush members 31 of the flat type attached to the brush holders 21 project from mounting plates 32 in such a manner to be at right angles to the metal mold faces. The mounting plates 32 are attached to swingable shafts 33 which are attached to the brush holders 21, through anti-vibration members 34 such as resilient rubbers. By a vibration-applying member 35 adapted to vibrate with the use of, for example, a rotating force of a motor transmitted through an eccentric cam or other, the mounting plates 32 are vibrated to apply vibration to the brush members 31 in unspecified directions.

The operating mechanism 14 for actuating the cleaning mechanism 13 has a dust collector case 36, a dust collector 37 and a device 42 for supplying compressed air 43. The dust collector case 36 is connected to the dust collector 37 by a vacuum hose 38. The dust collector case 36 is connected to the ducts 22 of the cleaning mechanism 13 by flexible vacuum hoses 39.

When the dust collector 37 is operated, the pressure in the hose 38, the dust collector case 36, the hoses 39, the ducts 22 and the brush holders 21 are reduced to produce a suction force, under the action of which the air around the brush members 31 is forcibly sucked through a plurality of dust collecting holes 40 formed in the brush holders 21.

The compressed air feed device 42 is connected to a compressor (not shown) by a pipe 44 and to the ducts 45 in the frames 15 by flexible hoses 46. The ducts 45 are connected to compressed air outlet ports 32a formed in the mounting plates 32 of the brush members 31 by flexible hoses 47.

When the compressed air feed device 42 is operated, compressed air 43 is fed to the compressed air outlet ports 32a formed in the mounting plates 32, through the hoses 46, ducts 45 and hoses 47 which communicate with each other. Such compressed air is spouted to the outside through a plurality of air spouting holes 32b which communicate with the compressed air outlet ports 32a and open into the brush mounting surfaces.

The cleaning mechanism 13 may be reciprocatively moved in the left and right directions by rotation of the drive gears 19. An electric signal for actuating the forwardly and reversely rotating motor which rotates the drive gears 19, may be applied, for example, through limit switches (not shown) operable in response to the vertical movement of the movable metal mold 2. Accordingly, when the molds 2 and 3 are separated from each other, the cleaning mechanism 13 is automatically moved to the space between the molds 2 and 3, and when the mold 2 is to be pressed toward the mold 3, prior to such pressing the cleaning mechanism 13 is moved outside the forming machine 1.

The description hereinafter will discuss how the cleaning operating is performed by the apparatus for cleaning the faces of plastic forming metal molds shown in the embodiment described hereinbefore.

When one forming process cycle is completed with a formed product removed after the movable metal mold 2 has been lowered, the forwardly and reversely rotating motor for actuating the cleaning mechanism 13 is rotated in the direction to advance the cleaning mechanism 13. Such rotation of the motor is transmitted to the transmission gears 20 through the drive shaft 18 and the drive gears 19. Thus, the cleaning mechanism 13 is advanced to the space between the metal molds 2 and 3 along the guide rails 11 through the racks 11b.

When the vibration-applying member 35, the dust collector 37 and the compressed air feed device 42 are operated simultaneously with the advancement of the cleaning mechanism 13, vibration in unspecified directions are applied to the brush members 31 by the vibration-applying member 35. Accordingly, when the brush members 31 are moved as they are being vibrated along the faces of the metal molds 2 and 3, flashes left on and stuck to the faces of the metal molds are beaten and broken throughout by the tips of the brush members 31 under the action of vibration applied thereto in unspecified directions. At this time, compressed air 43 is spouted from the brush members 31 toward the faces of the metal molds, and an air sucking force acts on the circumferences of the brush members 31.

Simultaneously applied therefore to the flashes are a flash removal accelerating action provided by cooling effect of the compressed air 43, an effective flash removing action which the brush members 31 provide while beating and breaking throughout the flashes, and action of sucking and taking out flashes to the outside of the forming machine. Thus, the flashes left on and stuck to the faces of the metal molds can be separated and removed in a very short period of time in an efficient and secure manner.

Figure 4:
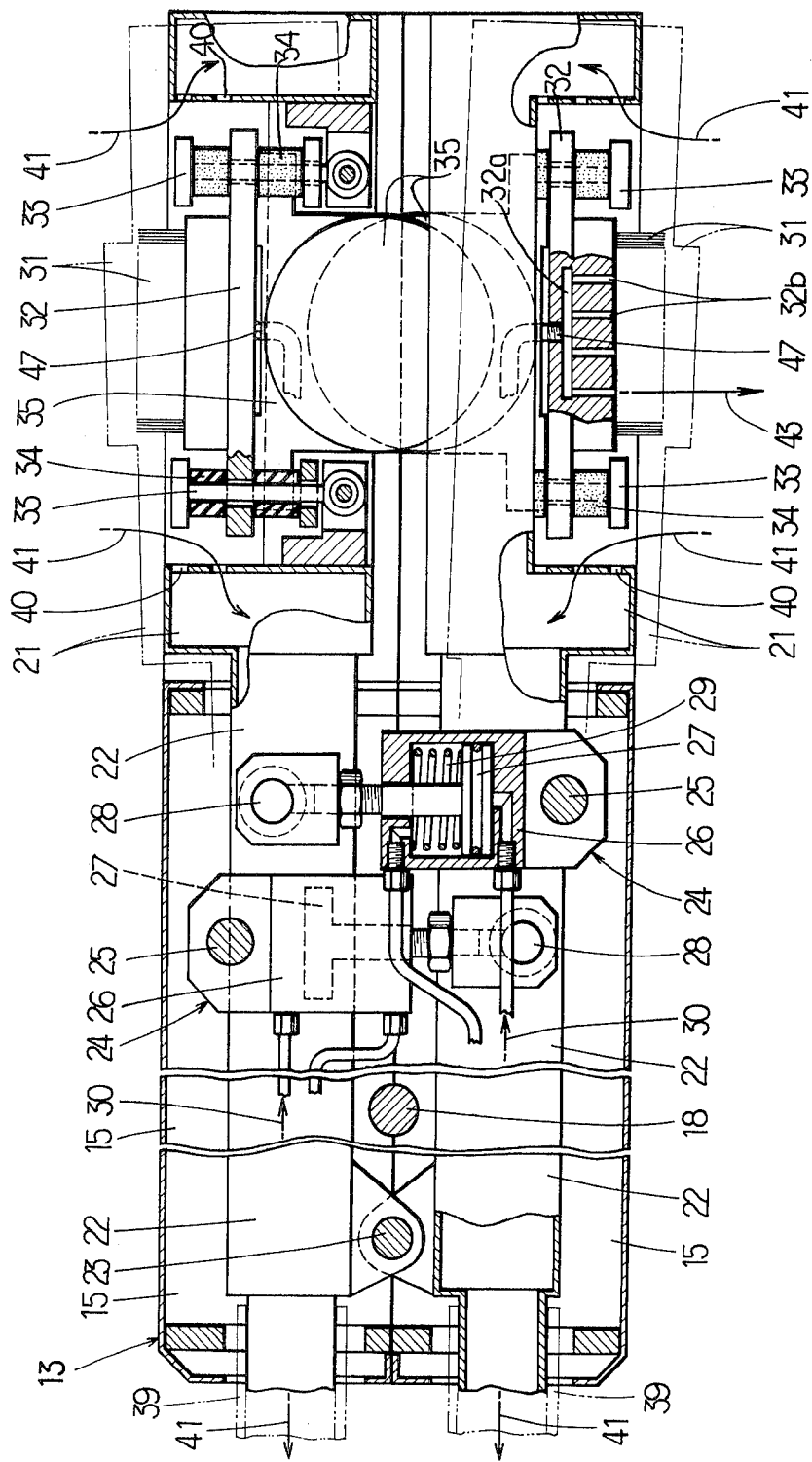
FIG. 4 is an enlarged section view, with portions broken away, taken along the line III—III in FIG. 2.

If the tip projecting length of the brush members 31 is insufficient or the tips of the brush members 31 are required to be pressingly contacted with the faces of the metal molds, the operating mechanism 14 may be operated to actuate the rotating members 24 for rotating the ducts 22 and the brush holders 21, so that the tips of the brush members 31 are suitably projected as shown by imaginary lines (chain lines or broken lines) in FIG. 4. For this purpose, compressed air 30 may be introduced into the cylinders 26 constituting the rotating members 24. When the pistons 27 are then pressingly moved against the springs 29, the pistons 27 move the ducts 22 and the brush holders 21 toward the pivoting members 28 through the pivoting members 28 and the shaft 23.

When it is desired to reset the brush members 31 to the original positions, all that is merely required is to stop the feed of compressed air. By stopping the feed of compressed air, the ducts 22 and the brush holders 21 are moved to the original positions by the pistons 27 which have been put back by spring-load of the springs 29, thus resetting the brush members 31 to the original positions.

The preferred embodiment of the present invention being thus described, it should be appreciated that such embodiment is discussed merely by way of example. The present invention is not therefore limited to such embodiment, but all modifications and variations thereof should be included in the present invention without departing from the spirit and scope of the following claims.

What we claim is:

1. A method of cleaning the opposed faces of plastic forming metal molds comprising the steps of:
   applying vibration to flat brush members disposed oppositely to the faces of plastic forming metal molds;
   beating and breaking flashes stuck to said mold faces, by the tips of said brush members, thereby to remove the flashes;
   blowing air to said metal mold faces through said flat brush members to cool the flashes stuck thereto; and
   sucking and taking out the thus removed flashes.

2. A method according to claim 1 wherein said flat brush members are mounted on a cleaning mechanism disposed movably with respect to the faces of said molds.

3. A method according to claim 2 wherein said flat brush members are movably mounted to said cleaning mechanism such that said brushes are movable toward respective said mold faces, and further including the steps of moving said cleaning mechanism relative to said mold faces to position said brushes opposite said mold faces and pressing said brushes against respective said mold faces.

4. An apparatus for cleaning the opposed faces of plastic forming metal molds comprising:
   a cleaning mechanism disposed movably between the opposed faces of the metal molds, said cleaning mechanism having
   (a) flat brush members for removing flashes left on and stuck to the mold faces,
   (b) a vibration-applying means for vibrating said brush members,
   (c) an air feed means for flowing cooling air through said flat brush members to the mold faces, and
   (d) a sucking means for sucking the thus removed flashes away from the mold faces; and
   an operating mechanism for moving said cleaning mechanism.

5. An apparatus for cleaning as claimed in claim 4 wherein said cleaning mechanism further includes a mounting means for mounting said flat brush member for movement away from one another, and a spreading means for moving said flat brush members away from one another and into a pressing contact with respective said mold faces.

6. Apparatus for cleaning the faces of plastic forming metal molds as set forth in claim 5, wherein the plastic forming metal molds include a movable metal mold and a fixed metal mold.

7. Apparatus for cleaning the faces of plastic forming metal molds as set forth in claim 5, wherein the sucking means are connected to a dust collector case in the operating mechanism through flexible vacuum hoses.

8. An apparatus for cleaning as claimed in claim 5 wherein said mounting means includes a pair of elongate support bases each said base having a distal end to which a respective said brush is attached and a proximal end which is pivotably mounted to said cleaning mechanism.

9. An apparatus for cleaning as claimed in claim 8 wherein said spreading means includes a pneumatic cylinder mounted between said pair of elongate support bases and a spring biasing means for resiliently biasing said pair of elongate support bases toward one another.

* * * * *